INFORMATION TRANSFER SYSTEM HAVING PLURAL STAGE MEMORY
Filed July 19, 1965 3 Sheets-Sheet 1
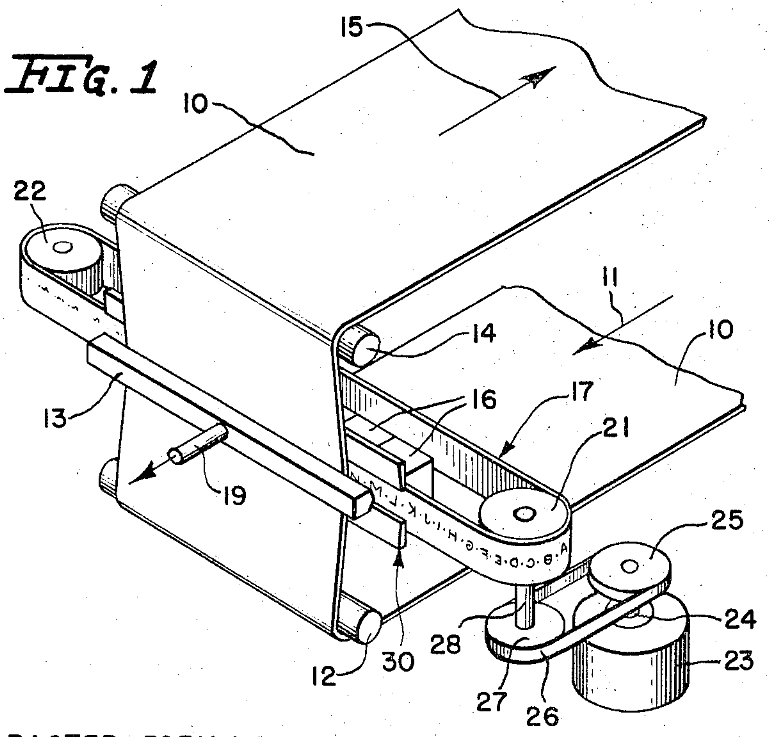
FIG. 1
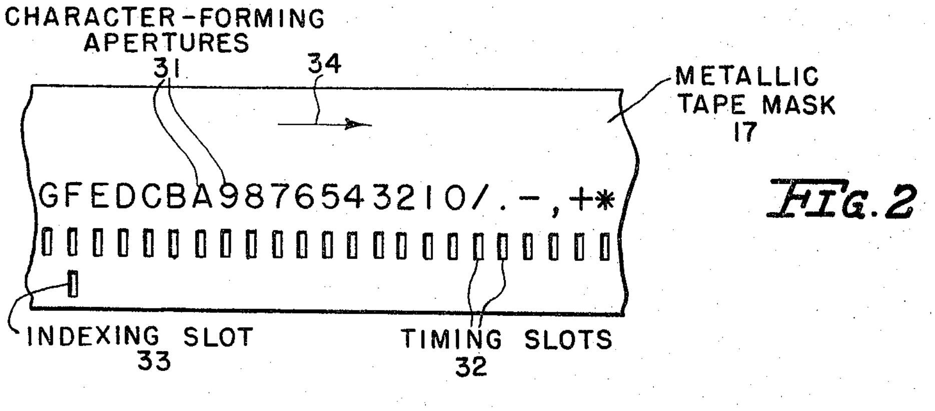
FIG. 2
| | | | | | | | | | | | | | | | | | |
|---|---|---|---|---|---|---|---|---|---|---|---|---|---|---|---|---|---|
| E | D | C | – | – | B | A | 9 | 8 | 7 | 6 | 5 | 4 | 3 | 2 | 1 | 0 | / | APERTURE |
| 1 | 2 | 3 | – | – | 68 | 69 | 70 | 71 | 72 | 73 | 74 | 75 | 76 | 77 | 78 | 79 | 80 | COLUMN LOCATIONS |
| 14 | 13 | 12 | – | – | 11 | 10 | 9 | 8 | 7 | 6 | 5 | 4 | 3 | 2 | 1 | 0 | 63 | MASK CHARACTER SEQUENCE |
| 15 | 15 | 15 | – | – | 15 | 15 | 15 | 15 | 15 | 15 | 15 | 15 | 15 | 15 | 15 | 15 | 15 | SUM |
| | | | | | +64 | 64 | 64 | 64 | 64 | 64 | 64 | 64 | 64 | 64 | 64 | 64 | 64 | |
| | | | | | | | | | | | | | | | | | +64 | |
FIG. 3
INVENTOR.
William P. Foster
BY
James J. Jennings, Jr.
Attorney INVENTOR.
William P. Foster
BY
James J. Jennings, Jr.
Attorney April 18, 1967 W. P. FOSTER 3,314,360
INFORMATION TRANSFER SYSTEM HAVING PLURAL STAGE MEMORY
Filed July 19, 1965 3 Sheets-Sheet 3

| CHARACTER | BINARY CODED REPRESENTATION | REFLECTED BINARY CODE REPRESENTATION |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |

INVENTOR.
William P. Foster
BY
James J. Jennings, Jr.
Attorney 3,314,360

INFORMATION TRANSFER SYSTEM HAVING PLURAL STAGE MEMORY

William P. Foster, Paoli, Pa., assignor to Borg-Warner Corporation, Chicago, Ill., a corporation of Illinois Filed July 19, 1965, Ser. No. 473,080
17 Claims. (Cl. 101—122)

The present invention is directed to a charging station for an electrostatic printing system in which clouds of ions are directed toward character-forming apertures in a stencil electrode, being shaped by passage through the stencil electrode apertures to denote a character on a web, and more particularly to the method of and an arrangement for providing the clouds of ions at the appropriate times in relation to displacement of the stencil electrode.

In the field of information processing, the rate of information print-out from high-speed apparatus such as computers has lately been increased by the utilization of electrostatic printing means in which the intelligence is deposited "on-the-fly" on a dielectric web, rather than in a more conventional print-out in which electro-mechanical means such as printing hammers are utilized to imprint the desired intelligence. Recent work has indicated the feasibility of utilizing a stencil electrode adjacent a discharge head, or a multiplicity of discharge electrodes which produce a cloud of ions for passage through the stencil electrode to impinge on the dielectric web. With the dielectric web apertured to define a plurality of character-forming openings therein, the clouds of ions are shaped in accordance with the openings, depending on which opening is in registration with the energized charge head, to direct the cloud of ions through the apertures in the stencil electrode. Such a stencil electrode may take different forms, for example, that of a cylinder with the charge heads in the interior of the cylinder. The stencil may be a disc with the charge heads on one side of the disc and the web on the other side, or the stencil electrode may be an endless metallic tape mask journaled around a pair of pulleys for passage at a high speed between the charge heads and the paper web. Because of this high speed, which may be of the order of one thousand inches per second, there is a problem in obtaining accurate positioning of the stencil electrode apertures exactly opposite the energized charge heads at the precise moment the cloud of ions is directed toward the dielectric web. It is accordingly a primary consideration of the present invention to provide a novel and unobvious arrangement for precisely positioning the desired character-forming openings in a stencil electrode opposite an energized discharge head or heads at the exact moment required to shape the cloud of ions produced by the discharge head before passing toward and impinging on the dielectric web.

When the stencil electrode is in the form of an endless metallic tape, which presently is considered the preferred method of practicing the aperture printing technique in the electrostatic art, the extremely fast speed of the tape raises a possibility of "spillover" or inadvertent passage of a portion of the cloud of ions through the portions of the character-denoting apertures on either side of that single aperture through which it is desired to pass the main body of the charge. It is accordingly another significant consideration of the present invention to provide a novel and unobvious tape mask indexing arrangement which substantially eliminates "spillover" or inadvertent deposition of the ions on the portions of the dielectric web adjacent the web which should be charged.

The foregoing and other considerations are realized in an electrostatic printing system in which a stencil electrode or mask is displaced between an array of charge heads and a dielectric web so that energization of a charge head provides a cloud of ions for passage through an aperture in the stencil electrode to strike the web and represent information signals in the appropriate column locations on the web. In one embodiment the control system of the present invention includes a memory with a number of storage stages, and means for converting each received information signal into a sum signal for each column location which denotes a specific stencil electrode position which will print the required character at the specified column location. Means is provided to load the sum signals into the respective memory storage stages at the appropriate column locations. Means is also provided for deriving a mask code signal signifying the location of the apertures in the stencil electrode and for applying the mask code signal to the memory storage stages, so that responsive to agreement between the sum signal previously stored in a particular memory stage and a corresponding mask code signal denoting registration of the appropriate mask aperture between the charge head and the web, the correct charge head is energized and a cloud of ions is directed through the desired aperture.

It is important to note that the same mask code signal is simultaneously applied to all the storage stages in the memory. For a given position of the mask or stencil electrode, the 0 aperture will be opposite one charge head, the 1 aperture adjacent the next head, the 2 aperture adjacent the next head, and so forth. Thus different memory stages or circuits may have the same sum signal stored therein, but in that these identical values are stored at different column locations, each identical value represents a different character to be printed on the web.

In a preferred embodiment the stencil electrode takes the form of an endless metallic tape apertured to define successive fonts of characters. Four complete sets of characters may be provided in one endless tape, so that it is not necessary to make a complete revolution of the stencil electrode to imprint all the information contained in the memory. Likewise in the preferred embodiment the character-denoting apertures are spaced apart from each other by an extra distance to leave a space between; in effect, this means two characters such as the A and B would be positioned opposite the first and third charge heads, rather than opposite the first and second charge heads. This arrangement contributes to the substantial elimination of "spillover" or inadvertent passage of the ions through the adjacent character-forming apertures when only one discharge head is energized to print the character. This double spacing of the characters along the stencil electrode leads to related modifications of the basic system which will be explained in detail in connection with the drawings.

To enable those skilled in the art to make and use the invention, it will be described in connection with the accompanying drawings, in the several figures of which like reference numerals identify like elements, and in which:

FIGURE 1 is a perspective illustration of an electrostatic aperture printing station in which the present invention finds utility;

FIGURE 2 is a front view, taken on a scale enlarged with respect to that of FIGURE 1, illustrating one form of the stencil electrode;

FIGURE 3 is an illustrative showing useful in explaining the techniques of the invention;

*Electrostatic printing station*

Figure 4:
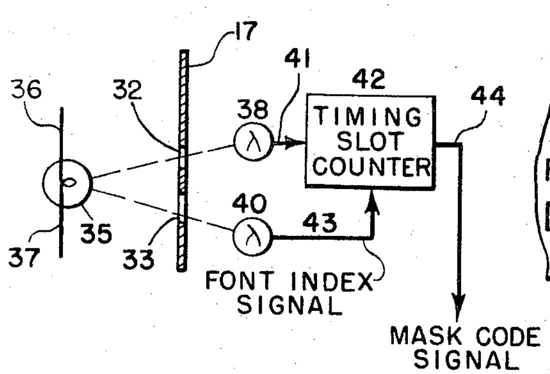
FIGURE 4 is a partial block diagram useful in explaining the system of the present invention.

FIGURE 1 depicts the general printing station arrangement in which a dielectric web 10 is drawn in the direction of arrow 11 over a first guide roller 12, thence upwardly over an anvil or reference electrode 13. A slight vacuum is drawn from the interior of anvil 13 through conduit 19 to insure the dielectric web is positioned against anvil 13 as it passes the printing area. The dielectric web 10 passes upwardly from anvil 13 over guide roller 14 and to the right in the direction of the arrow 15.

A plurality of discharge heads 16 are disposed in an array opposite the anvil 13. In this embodiment the discharge heads are in a linear array but of course other arrangements can be utilized. Each of the blocks designated 16 may in fact comprise a multiplicity of discharge heads but the detailed showing of the individual parts of electrodes which are energized to provide the clouds of ions is not requisite to a complete understanding of the present invention. A mask or stencil electrode 17 is provided and journalled around a pair of indexing pulleys 21 and 22 for passage between the discharge heads 16 and the portion of paper web 10 abutting anvil 13. The character-forming apertures are visible in FIGURE 1, as is an indexing or alignment assembly 30 for maintaining the endless metallic tape 17 in precise alignment as it passes between the charge heads and the paper web. The alignment means may take the form of an air-bearing arrangement in which air is entrained and dragged along by the high speed of tape mask 17 to provide a cushion between the stencil electrode 17 and adjacent portions of the air-bearing assembly, thus to obtain the appropriate alignment of the stencil electrode with respect to the adjacent portions of the discharge system. Displacement of the tape is obtained by energization of motor 23 which drives shaft 24 coupled to a pulley 25. Belt 26 transmits displacement from pulley 25 to the other pulley 27, coupled over shaft 28 to driving pulley 21 of the tape mask system.

FIGURE 2 depicts the metallic tape mask 17 in more detail. As there shown, the plurality of character-forming apertures 31 are provided approximately in the center of the stencil electrode, and just below the character-denoting apertures a like plurality of timing slots 32 are etched in the metallic mask. An indexing slot 33 is provided and, in the illustrated embodiment, it is shown positioned just below the timing slot aligned with the "F" character of the array of character apertures 31. Those skilled in the art will appreciate that other stencil electrodes can be utilized, for an example in the form of a cylinder with the characters etched in the outside of the cylinder or of a disc with the characters provided near the outer edge of the disc. In the preferred tape mask embodiment a stainless steel tape or belt of three thousandths (mils) of an inch in thickness had proved satisfactory, being kept to a tolerance of plus or minus one-tenth of a mil. The tape mask provided was 1.625 inches wide. The character-denoting apertures as shown in FIGURE 2 were on centers spaced one-tenth of an inch from each other, and the line of write, a line drawn through the bottom portion of each character parallel the edges of the tape, was 0.7825 inch from the bottom of the tape. Each of the timing slots 32 and the indexing slots 33 were one-eighth of an inch high, but the timing slots 32 were only 15 mils in width as compared to the 35 mils for the indexing or font counter slot 33. Thus it is evident that by creating a cloud of ions and directing it towards any of the apertures 31, the mass of ions will be shaped as it passes through the aperture to impinge on a portion of the dielectric web 10 shown in FIGURE 1. Appropriate timing signals can be provided by placing a lamp on one side of mask 17 and sensing, with photocells or similar units, the light passing through the slots 32 and 33. With this general perspective of the inventive arrangement, the invention will now be described in detail.

*General arrangement of the invention*

To control energization of the charge heads at the correct times and to provide minimum print cycle time some restrictions are placed on the arrangement of character apertures in the mask electrode. Each character to be printed is associated with a "code," termed a character code or data code. Each code includes a group of information bits or units, and each code (or group of bits) is assigned a numerical value known as weight. The code weighting scheme selected for this invention must admit of arithmetic operation on the code groups as required. A preferred system is that of binary weighting, now well known in the computer art. For example a six bit binary "word" or code group can provide 64 different codes each having a different weight from 0 to 63. Characters (A, B, C, . . . 1, 2, etc.) must be placed on the mask in order of their respective code weights. All intermediate code weight values must be represented. If no character is assigned to a code weight value, a blank mask position is required at the mask position identified by that specific code weight value. When a mask is aligned with the column locations for printing, the order of increasing code weights must be opposite to the order of increasing column numbers. Code weight is thus seen to represent character sequence so that the essential feature of a particular character code can be specified by the number representing its sequence on the mask. A font or series of characters must contain an exact integral number of mask positions, and a mask must contain an exact integral number of fonts.

Assume that the character mask 17 moves through the alignment assembly 30 from left to right as shown in FIGURE 1 and as represented by the arrow 34 in FIGURE 2. The charge heads (not visible behind the tape mask) may include as many as eighty or even more charge heads. For the present explanation it is assumed that there are eighty charge heads located in a linear array behind the character-forming apertures of the tape mask at the print location. This will correspond to the width of the paper or other dielectric web passed over the anvil to receive imprinting or selective charging at the print station. Thus the print heads or charge heads are represented by the sequence of numbers 1, 2, 3 . . . 79, 80 in the second line of FIGURE 3, which numerals are also related to the column locations on the web 10 which is to receive the printing. It is assumed that the data codes assigned to the characters 31 shown in FIGURE 2 will provide the required inverse mask sequence. The assumed sequence is 0, 1, 2, . . . 63 from right to left as shown in FIGURE 3 in which line 3 represents the mask character sequence. At a particular instant when the character apertures align with the column positions the mask has one of 64 possible locations. Each mask location can be identified with a code having a weight in the range of 0, 1, 2, . . . 63, and this is called the mask code. Mask code weights are assigned by adding one to the sequence of the mask character aligned with column 1 at the particular instant. As shown in FIGURE 3 sequence 14 at at column 1 results in a mask code of 15.

Because of the inverse order of the mask character sequence, the sum of any column location and the aligned mask character sequence equals 15 for the location shown if the addition is done on a modulo 64 basis. That is, where the sum exceeds 64 a multiple of 64 is subtracted to obtain the mask code. The subtraction is a straightforward logic operation well known in the computer art. However those skilled in the art will recognize that the amount of circuitry required can be significantly reduced if the number of possible character locations is an exact multiple of two. For example the case illustrated uses 64 character locations and the binary subtraction operation does not affect those bit positions having a weight less than 64. If there were 63 locations the subtraction logic would affect all bit positions. The fact that the mask code can be computed for any combination of column position and character identification makes it very useful. Input data codes to be printed represent mask character sequence values which, when added to the column location information in the manner described, produce a mask code signal which is stored in a column location.

If mask character sequence is counted with reference to an imaginary zero column as the tape 17 moves in direction 34, the count is the sum of zero column and character sequence so that mask code equals sequence count under these conditions. Modulo 64 addition is provided automatically by limiting the counter to a range of 64 in a well known manner.

FIGURE 4 indicates how the mask code signal can simply be derived. As there shown, an illuminating means such as a lamp 35 is energized over conductors 36, 37 to pass light both through the series of timing slots 32 and through each indexing slot 33, as each font of characters in the mask 17 is displaced between the web and the charge heads. A first photocell 38 is disposed to receive the bursts of light through the successive timing slots 32, and a second photocell or a similar unit 40 is positioned to receive light each time one of the indexing slots 33 passes between lamp 35 and the photocell. The timing signals from photocell 38 are applied over an input conductor 41 to timing slot counter 42, and the font indexing signal is applied over conductor 43 to reset the count of timing slot counter 42 each time another font on the tape mask passes the sensing point. Accordingly, the mask code signal is provided over output channel 44 to indicate, by means of a single code, which aperture is opposite each different column location or each different discharge head at a given instant in time.

Figure 5:
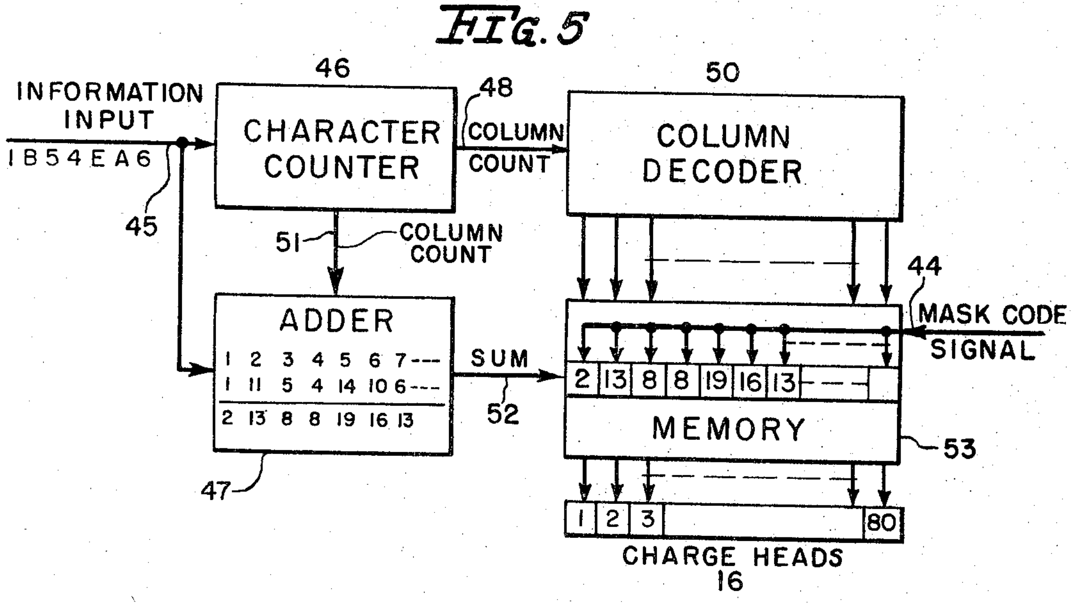
FIGURE 5 is a block diagram illustrating one embodiment of the present invention.

FIGURE 5 indicates a general arrangement for utilizing this mask code signal to assure appropriate registration of each character-forming aperture between the energized one of the charge heads and the web. Suppose, for purposes of explanation, that a serial train of characters is received over information input channel 45. These characters successively received are 1, B, 5, 4, E, A, 6 . . . . Although serial in point of time, each character may be denoted by an eight-bit code, that is, one in which eight simultaneous bits or information signals are received over parallel lines to denote each successive character. One of these bits may be a "sprocket" or timing signal, which is supplied (together with the other bits) to the input side of both character counter stage 46 and adder stage 47. Character counter 46 continually counts the number of received characters, and provides an output or "column count" signal denoting how many characters have been received. The column count signal is provided from character counter 46 over channel 48 to column decoder 50, and the column count signal is likewise provided from character counter 46 over channel 51 to adder stage 47. Those skilled in the art will appreciate that character counter 46 can be eliminated and replaced by any suitable means (even within units 47 and/or 50) for providing the equivalent of the column count signal.

In the adder stage, the first column count numeral 1 is received as shown at the far left of this stage at the same time that the first information input character is received. Numeral 1 has a character sequence value of 1 as shown in FIGURE 3. Thus the first character value plus first column value is a composite or sum signal of 2, as a result of the column count 1 and the "value" 1 of the character 1. As the next character B is received, the character-counter provides a signal 2 denoting the second column, and as evident from the showing of FIGURE 3, the character sequence value shown in FIGURE 3 for character B is 11. In the second column, with the column count of 2 and the "value" 11 of B, the sum of 13 is provided. In a related manner adder stage 47 provides in the third column, when added to "value" 5 of character 5, a sum of 8; it is noted that the same sum 8, is provided in the fourth column when the character 4 is received. In the fifth column the representation of E results in a sum of 19; in the sixth column character A is depicted by a total or sum of 16; and the receipt of the character 6 for printing in the seventh column is depicted by the sum 13. As each of these individual sum signals is provided for the different column locations, the sum signals are passed over channel 52 to the input circuits of each of the memory stages or circuits within memory 53. Column decoder 50, however, is operable to "open" or gate on only that one of the memory circuits in unit 53 which is in the appropriate column position for energizing the desired charge head at the proper time. That is, when the first character 1 is passed to the character counter 46 and to adder 47, column decoder 50 receives the column count signal 1 for the first column and opens the first gate to "load" or receive the sum signal 2 indicating that character 1 should be printed in the first column position. Upon receipt of the second character B the second column gate is opened and the sum 13 is stored in the second column position. In a similar manner each of the other sum output signals from adder 47 are stored across the entire line related to an entire line to be printed on the web 10.

The individual stages in memory 53 may be semiconductor circuits, with a separate flip-flop circuit for each binary digit required in the individual stage or circuit. Thus, in an embodiment using 64 timing slots per font, six flip-flops are employed in each memory stage. Each of the memory circuits includes a "loading" connection for receiving the appropriate gating signals from column decoder 50 to "load" the sum signals received over conductor 52. Conventional magnetic core elements could also be utilized as the individual memory stages, but because of the high speed operation of the inventive system, it is preferred to utilize the semiconductor flip-flop arrays for each separate memory stage or circuit.

It is then assumed that mask 17 is displaced past the array of charge heads. It is noted that in FIGURE 2 the indexing slot 33 is physically displaced from the first character 0, thus to compensate for the physical offset of the sensing means with respect to the actual location of the charge head at the first column position. The font reset signal is sensed and passed to the control equipment; the font reset signal resets the mask code counter to zero at the instant the maximum character sequence count 63 is aligned with column 1. This is a continuous operation which during normal operation becomes redundant, since the counter limited to modulo 64 returns to zero after counting 63. In this manner the moving tape delivers a continuous sequence of mask codes representing the changing status of mask location. Correct mask code is assured by proper reset timing. When a mask code signal having value 2 is delivered to memory 53 over channel 44, column 1 "recognizes" it as equal to the sum value previously stored in address (column location 1) and causes the associated charge head 16 to fire. This operation prints a character which is determined by reversing the addition process. That is, column 1 subtracted from mask code 2 leaves character sequence 1 and as indicated in FIGURE 3, this will print a character 1 which is precisely that required by the input signal on channel 45 as shown in FIGURE 5. In extending this theory conditions will be noted where the column number exceeds the mask code. Where this occurs it is necessary to add a multiple of 64 before subtraction. It is noted that when a mask code signal having a value 8 is applied to memory 53, both column 3 and column 4 are fired but character 5 is printed at the column 3 location while adjacent character 4 is printed at the column 4 location.

*Preferred embodiment of the invention*

Figure 6:
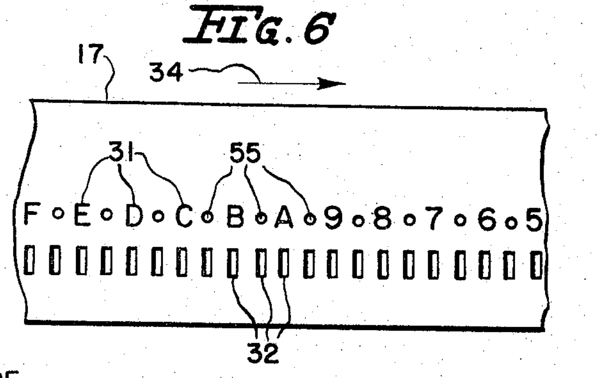
FIGURE 6 is a front view, similar to that of FIGURE 2, depicting the stencil electrode configuration in a preferred embodiment of the invention.

FIGURE 6 depicts another stencil electrode constructed in accordance with the preferred arrangement of the invention. As there shown, the character-denoting apertures 31 are spaced apart twice the spacing in the basic system shown in FIGURE 2. In this preferred system provision is made for 96 character apertures in the mask. By way of numerical example, the character apertures would be spaced on centers two-tenths of an inch apart as contrasted to the one-tenth inch center-to-center spacing of FIGURE 2. Further in accordance with the inventive teaching, error signal apertures 55 are provided intermediate each of the character-forming apertures so that if any erroneous energization of a charge head should occur at a time when information is not to be printed, a small dot will appear in the ultimately developed and fixed image to indicate this on the printed record. However, in that the spacing of the timing slots 32 is still the same, on one-tenth inch centers or two timing slots for each character position, some adjustment must be made in the system to ensure that the appropriate charge heads are energized at the proper time in relation to the mask code signal.

Figure 7:
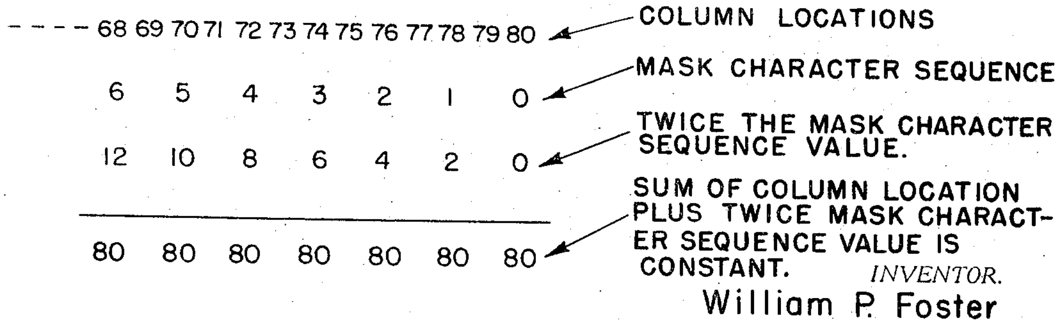
FIGURES 7 and 8 are tabular presentations useful in understanding the preferred embodiment of the invention.

The timing slots determine the mask code in this preferred system exactly as described previously in connection with the system shown in FIGURE 5. Since in the preferred system 96 character places are required and double character spacing is necessary, the preferred font includes 192 timing slots, 96 error apertures and 96 character apertures. There are 192 mask locations and 192 mask codes, even though only 96 mask codes are used for character printing. The printing codes are alternately spaced so that mask character sequence is double the normal sequence. Accordingly, to provide the appropriate information-denoting signal from a stencil such as shown in FIGURE 6, the value of the mask character sequence position is doubled as shown in the third line of FIGURE 7, so that the sum of the column location plus twice the mask character sequence value is a constant, as indicated in the bottom line of FIGURE 7. With this basis for the comparison of the mask code with the information code (column value plus twice character value), a system can still be utilized working with the basic techniques described previously in connection with FIGURES 2–5.

To print an error signal aperture, use of the odd-even nature of column firing times is exploited. It is noted that a character array aligns with either odd column locations (1, 3, 5 . . . ) or even column locations (2, 4, 6 . . . ), but not both. If a mask code is first correctly programmed and thereafter altered from an odd to an even value or vice versa, the subsequent print operation will cause the column pulser to fire between character apertures or when the error signal aperture is aligned opposite the charge head. Those skilled in the art will recognize that since the stored mask code has twice as many counts as are required for characters, there is one redundant binary bit in the mask code expression, which permits the detection of single bit errors. This can be utilized by converting the mask code to reflected binary code as depicted in the right hand column of values in FIGURE 8.

As there shown, for the characters 0–9, the conventional binary coded representation employs a sequence of four different digits which change from character to character. Between the characters 0 and 1, there is only a change in the last digit. However, in the changes between other successive characters, as between 7 and 8, all four of the different bits are changed. In contradistinction, in the reflected binary coded representation in the right-hand portion of FIGURE 8, only one bit is changed as the value of the character is successively changed. Because of this, a change in a single bit in the converted code causes a change from odd to even or vice versa. This meets the necessary condition, described above, for printing an error aperture in response to a single bit error.

Figures 8, 9:
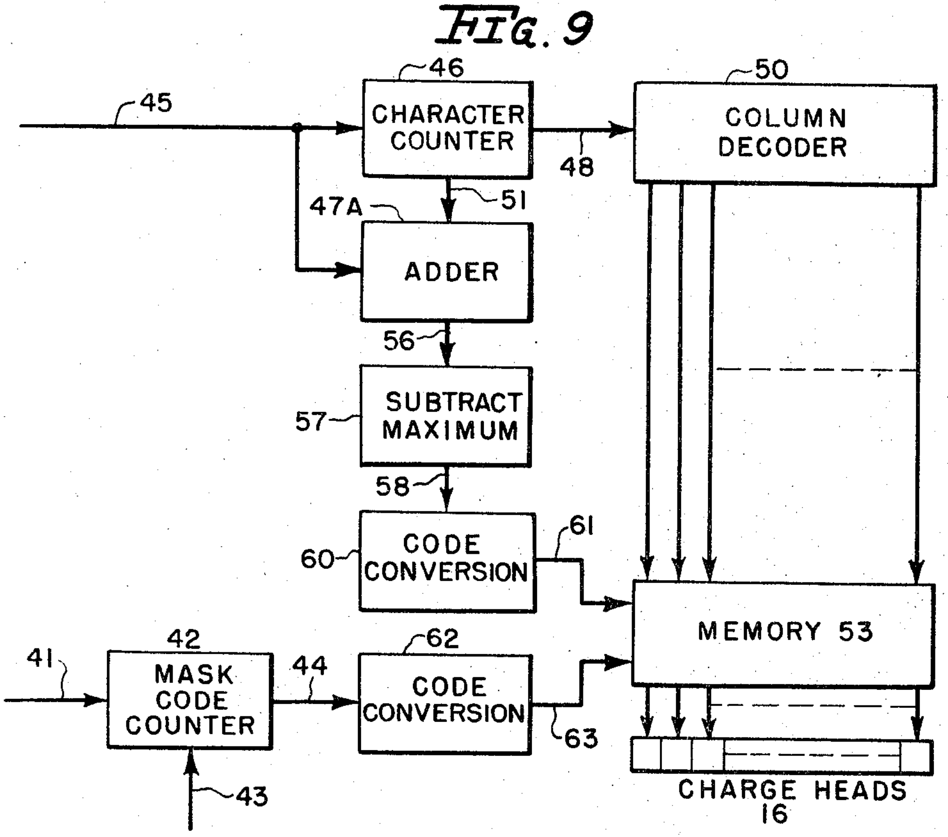
FIGURE 9 is a block diagram illustrating a preferred embodiment of the present invention.

The preferred embodiment shown in FIGURE 9 is similar in some respects to the system of FIGURE 5. That is, the serially received information input signals are passed from channel 45 to the input circuits of each character counter 46 and adder stage 47A. The column count signals passed over channel 48 to column decoder 50 are utilized in the same manner as previously described to sequentially gate the memory circuits at the column positions of memory 53.

The adder stage 47A provides the sum signals, denoting the combination of twice the character value with the desired column location, over a channel 56 to the subtract maximum stage 57. This stage is effective to subtract a multiple of the total number of timing slots when required to bring the mask code within range as described previously. Data is received over channel 56. The resultant sum signal is then passed over channel 58 and converted in code conversion stage 60 to one of the family of Grey codes, of which only a single bit changes from character to character. The resultant converted signal is passed over channel 61 to the input portions of the circuits in memory unit 53 as selectively opened for loading at the column positions determined by the operation of column decoder 50. As previously described the timing signals are received over conductor 41 and the reset signals over conductor 43 to provide, on channel 44, a mask code signal which is passed to another code conversion stage 62 and converted to one of the Grey-type codes. The resultant converted mask code signal is passed over channel 63 to the comparison portions of the memory circuits within memory 53, and upon a matching of the mask code signal with the previously stored sum received over channel 61, the associated one of the charge heads 16 is energized to imprint the desired latent image on the dielectric web.

*Summary*

The invention provides a highly accurate system especially useful in connection with an aperture printing arrangement for an electrostatic printing system. When an endless tape mask is used as the stencil electrode, the character-forming apertures can be spaced at alternate column positions, as compared to the column locations on the paper, to substantially obviate spillover of the electrostatic charge from one position to another. With this arrangement of characters on the tape mask, a system for providing a single sum denoting both twice the value of the character to be printed, and the column position in which it should be printed, is stored in the memory stages adjacent the array of charge heads. A mask code signal is derived from motion of the mask, with each signal being effective to relate each of the character apertures to the specific column locations at the instant the timing signal is provided. Responsive to a matching or correlation between the mask code signal and the previously stored sum signal in a circuit of the memory array, the adjacent discharge head is energized to provide the cloud of ions and imprint the desired latent image on the web. A check on erroneous operation is provided by the error signal position between each of the two adjacent character apertures on the tape. In addition, another error check can be simply derived by noting if any of the odd column pulsers, that is, those charge heads at the column positions 1, 3, 5, and so forth, was fired when only one of the even column pulsers (at the 2nd, 4th, 6th, and so forth, columns) should have been fired. With these basic checks for accuracy and the utilization of the Grey-type code to further increase the accuracy of the over-all system, a positive-operating, highly accurate electrostatic printing arrangement is provided.

Other arrangements for practicing the invention will no doubt be suggested to those skilled in the art. Some alternate type of storage circuit or stage may be provided and individually coupled to the respective charge heads. It may be that the character counter and adder stages could be combined into a single stage for converting received information signals into the appropriate sum signals. Other arrangements, in lieu of the column decoder, might be provided for loading the sum signals into the respective memory storage stages at the appropriate column positions. In any event, the provision of the mask code signal and comparison of this signal with the sum signal will still regulate energization of the charge head at the desired column position.

While only particular embodiments of the invention have been described and illustrated, it is apparent that modifications and alterations may be made therein. It is, therefore, the intention in the appended claims to cover all such modifications and alterations that may fall within the true spirit and scope of the invention.

I claim:

1. In an electrostatic printing system in which a stencil electrode defining a series of character-shaped apertures is displaced between an array of charge heads and a dielectric web so that energization of a charge head provides a cloud of ions for passage through an aperture in the stencil electrode to impinge on the web and represent information signals in the appropriate column locations on the web, a control system for regulating firing of the charge heads comprising:

a memory having a number of storage stages;

means for converting received information signals into sum signals, each sum signal being referred to a particular column location and denoting which information signal is to be represented at said particular column location;

means for loading the sum signals into the respective memory storage stages at the appropriate column locations; and means for applying a mask code signal to the storage stages, so that responsive to agreement between the sum signal previously stored in a particular memory stage and receipt of a corresponding mask code signal at said particular stage denoting registration of the appropriate aperture between the charge head and the web, the correct charge head is energized.

2. In an electrostatic printing system in which a stencil electrode defining a series of character-shaped apertures is displaced between an array of charge heads and a dielectric web so that energization of a charge head provides a cloud of ions for passage through an aperture in the stencil electrode to impinge on the web and represent information signals in the proper column positions on the web, a control system for regulating firing of the charge heads comprising:

a memory having a number of storage stages;

means for converting received information signals into sum signals, each sum signal denoting a specific stencil electrode position relative to a particular one of said column positions;

means for loading the sum signals into the respective memory storage stages at the appropriate column positions;

means for providing a mask code signal signifying the aperture locations in said stencil electrode; and means for applying the mask code signal to the storage stages, so that responsive to agreement between the sum signal previously stored in a particular memory stage and receipt of a corresponding mask code signal at said particular stage denoting registration of the appropriate aperture between the charge head and the web, the correct charge head is energized.

3. In an electrostatic printing system in which a stencil electrode defining a series of character-shaping apertures is displaced between an array of charge heads and a dielectric web so that energization of a charge head provides a cloud of ions for passage through an aperture in the stencil electrode to strike the web and represent information signals in successive column locations along the web, a control system for regulating firing of the charge heads comprising:

means for adding a signal connoting the column location to each received information signal and thus providing a sum signal for each particular column location, which sum signal is referred to said particular column location and designates the character to be printed at said particular column location;

a memory having a number of storage stages related to the number of said column locations for storing said sum signals;

a column decoder for providing sequential gating signals to the successive memory storage stages to store the sum signals in the memory stages at the appropriate column locations;

means for deriving a mask code signal signifying the locations of the apertures in said stencil electrode and for applying said mask code signal to all the memory stages; and means for passing control signals to the charge heads at the respective column locations responsive to agreement between the sum signal stored in a particular memory stage and receipt of a corresponding mask code signal denoting registration of the appropriate stencil aperture between the charge head and the web.

4. In an electrostatic printing system in which a stencil electrode defines a plurality of fonts of character-shaping apertures, a series of timing indicia spatially related to the apertures, and a reset index related to the start of each font, the stencil electrode being directed between an array of charge heads and a dielectric web so that energization of a charge head provides a cloud of ions for passage through an aperture in the stencil electrode to strike the web and represent received information signals at the correct column locations along a line of the web, a control system for regulating firing of the charge heads comprising:

an adder for adding a column count signal denoting the column location on the web in which each successive information signal should be printed to each successive information signal as received and thus providing a sum signal for each given column location denoting which character is to be printed at said given column location;

a memory having a number of storage circuits connected to receive and store said sum signals;

a column decoder for providing sequential loading signals to the respective memory storage circuits to store the sum signals in the circuits related to the appropriate column locations;

means for sensing said timing indicia and said reset index to provide a mask code signal signifying the aperture locations along said stencil electrode and for applying said mask code signal to all the memory storage circuits; and means for controlling energization of the charge heads at the respective column locations responsive to correspondence between the sum signal previously stored in a particular memory circuit at a given column location and receipt of an identical mask code signal denoting registration of the appropriate stencil electrode aperture between the charge head at said given column location and the web.

5. In an electrostatic printing system in which an endless tape mask defines a plurality of fonts of character-shaping apertures and a plurality of timing marks spatially related to said character apertures, the tape mask being displaced between an array of charge heads and a dielectric web so that energization of a charge head provides a cloud of ions for passage through a mask aperture onto the web to represent information character signals at successive column locations along a line of the web, a control system for regulating energization of each charge head comprising:

an adder for receiving information signals over an input channel and adding to each successive information signal a column count signal which increases as each successive information character signal is received over the input channel to provide a sum signal for each particular column location denoting which character is to be printed at said particular column location on the web;

a memory having a number of storage circuits corresponding to the number of charge heads in the array and to the number of column locations along the web, each storage circuit having an input connection for receiving said sum signals from the adder, and each storage circuit having comparison and output connections;

a column decoder for providing sequential loading signals to the successive storage circuits in the memory to load the sum signals into the storage circuits at the appropriate column locations;

means for deriving a mask code signal from said timing marks to identify the mask aperture locations and to apply said mask code signal to the comparison connections of all the memory storage circuits; and means for selectively regulating energization of the ones of said charge heads at the column locations corresponding with those memory storage circuits indicating agreement between the sum signal stored in a particular memory circuit and the received mask code signal denoting registration of the appropriate mask aperture between the charge head and the web.

6. In an electrostatic printing system in which an endless tape mask defines a plurality of fonts of character-shaping apertures, a plurality of timing apertures oriented in a predetermined pattern relative to said character apertures, and a font index aperture signifying the start of each font of character apertures, the tape mask being displaced between an array of charge heads and a dielectric web so that energization of a charge head provides a cloud of ions for passage through a character aperture onto the web to represent an information signal at a particular column location along a line of the web, a control system for regulating energization of each charge head comprising:

means for receiving information character signals and providing a column count signal which increases by one digit as each successive information character signal is received;

an adder for receiving both the column count signals and the information character signals, operative to add each column count signal to the related information character signal and provide a sum signal referring to a particular web column location, said sum signal denoting the character to be printed at said particular web column location;

a memory, having a number of storage circuits related to the number of charge heads in the array and to the number of column locations along said web, for receiving said sum signals from the adder;

a column decoder for receiving the column count signals and providing sequential loading signals to the respective memory storage circuits to load the sum signals into the storage circuits at the appropriate column locations;

means for deriving a mask code signal from said timing apertures to signify the mask aperture locations and to reset the mask code signal responsive to each passage of a font index aperture;

means for applying the mask code signal to all the memory storage circuits; and means for controlling energization of the charge heads at those column positions corresponding with those memory circuits indicating agreement between the sum signal previously stored in a particular memory circuit and the later-received mask code signal, which agreement denotes registration of the appropriate character aperture between the charge head at the proper column location and the web.

7. In an electrostatic printing system in which a stencil electrode defining a series of character-shaping apertures is displaced between an array of charge heads and a dielectric web so that energization of a charge head provides a cloud of ions for passage through an aperture in the stencil electrode to strike the web and represent information character signals at successive column locations, a control system for regulating firing of the charge heads comprising:

a memory having a number of storage stages related to the number of column locations;

means for converting received information signals into sum signals, each sum signal being formed by adding a first value denoting a given column location, to a second value which is twice the value of the information character to be printed at said given column location, so that a specific sum signal referred to said given column location indicates the information character to be printed at said given column location;

means for loading the sum signals into the respective memory storage stages at the appropriate column positions; and means for applying a mask code signal to all the storage stages, so that responsive to agreement between the sum signal previously stored in a particular memory stage and receipt of a corresponding mask code signal at said particular stage denoting registration of the appropriate aperture between the charge head and the web, the correct charge head is energized.

8. In an electrostatic printing system in which a stencil electrode defining a series of character-shaping apertures is displaced between an array of charge heads and a dielectric web so that energization of a charge head provides a cloud of ions for passage through an aperture in the stencil electrode to strike the web and represent an information character signal at a desired column location on the web, a control system for regulating firing of the charge heads comprising:

an adder for adding a column count signal representing the desired column position of a given information character signal to a number representing twice the value of the given information character signal and thus providing a sum signal for each desired column location denoting the given information character to be printed as referred to said desired column location;

a memory having a number of storage circuits corresponding with the number of column locations for storing the sum signals;

a column decoder for providing sequential loading signals to the respective memory circuits to store the sum signals in the memory circuits at the appropriate column locations;

means for deriving a mask code signal signifying the locations of the apertures in the stencil electrode as referred to the column locations and for applying the mask code signal to all memory circuits; and means for governing energization of the charge heads at the respective column locations responsive to agreement between the sum signal previously stored in a particular memory circuit and receipt of a corresponding mask code signal at said memory circuit denoting registration of the appropriate aperture between the charge head and the web.

9. In an electrostatic printing system in which an endless metallic tape mask, including a plurality of character fonts, each font defining a series of character-shaping apertures, is displaced between a linear array of charge heads and a dielectric web so that energization of a charge head provides a cloud of ions for passage through an aperture of the tape mask to strike the web and represent an information signal, a control system for regulating firing of the charge heads comprising:

a character counter for receiving the information signals and providing a column count output signal;
an adder for adding the column count signal to a number representing twice the value of the formation signal and thus providing a sum signal for each given column location denoting the character to be printed at said given column location;
a subtraction stage for subtracting a predetermined value from the sum signal when required to reduce said sum signal to a value equal to or less than the total number of character-shaping apertures in one font;
a memory having a number of storage circuits for storing the sum signals;
a column decoder for providing sequential loading signals to the respective memory circuits to store the sum signals in the memory circuits at the appropriate column positions;
means for deriving a mask code signal signifying the locations of the apertures in the tape mask;
means for applying the mask code signal to all the memory storage circuits; and
means for regulating energization of the charge heads at the respective column positions responsive to agreement between the sum signal previously stored in a particular memory circuit and receipt of a corresponding mask code signal at said memory circuit denoting registration of the appropriate aperture between the charge head and the web.

10. In an electrostatic printing system in which an endless metallic tape mask including a plurality of character fonts, each font defining a series of character-shaping apertures, timing apertures and a front index aperture, the mask being displaced between a linear array of charge heads and a dielectric web so that energization of a charge head provides a cloud of ions for passage through an aperture of the tape mask to strike the web and represent an information signal, a control system for regulating a firing of the charge heads comprising:

a character counter for receiving the information signals and providing a column count output signal;
an adder for adding the column count signal to a number representing twice the value of the information signal and thus providing a sum signal for each particular column location denoting the character to be printed at said particular column location;
a subtraction stage for subtracting a predetermined value from the sum signal as required to reduce said sum signal to a value equal to or less than the total number of timing apertures in one font;
a code conversion stage for receiving the sum signal from the subtraction stage and converting the signal into a Grey-type code signal;
a memory having a number of storage circuits for storing the converted sum signals;
a column decoder for providing sequential loading signals to the respective memory circuits to store the converted sum signals in the memory circuits at the appropriate column positions;
means for sensing passage of the timing apertures and font index aperture in each font of the mask to provide a mask code signal signifying the locations of the character-shaping apertures in the tape mask;
means for converting said mask code signal into a Grey-type code signal;
means for applying the converted mask code signal to all the memory circuits; and
means for energizing the charge heads at the respective column positions responsive to agreement between the converted sum signal previously stored in a particular memory circuit and receipt of a corresponding converted mask code signal at said memory circuit denoting registration of the appropriate character-shaping aperture between the charge head and the web.

11. The method of controlling the firing of the charge heads of an electrostatic printing system through apertures in a mask electrode in accordance with received information signals comprising the steps of:

converting the received information signals into sum signals, each sum signal denoting both the column location and the received information character to be printed at such location;
loading the sum signals into the respective storage stages of a memory at the appropriate column positions; and
applying to the storage stages a mask code signal related to the position of the mask, so that agreement between the stored sum signal and the received mask code signal controls energization of the appropriate charge head.

12. The method of controlling the firing of the charge heads of an electrostatic printing system through apertures in a mask electrode in accordance with received information signals comprising the steps of:

converting the received information signals into sum signals, each sum signal being formed by adding a first value, representing the particular column location at which the received information character is to be printed, to a second value, which second value represents twice the value of said received information character to be printed at said particular column location;
loading the sum signals into the respective storage stages of a memory at the appropriate column positions; and
applying a mask code signal signifying the mask position to the storage stages, so that agreement between the stored sum signal and the received mask code signal regulates energization of the appropriate charge head.

13. The method of controlling the firing of the charge head of an electrostatic printing system through apertures in a mask electrode in accordance with received information signals comprising the steps of:

converting the received information signals into sum signals, each sum signal denoting both the column position and the received information character to be printed at such location;
loading the sum signals into the respective storage circuits of a memory at the appropriate column positions;
deriving a mask code signal related to the positions of the mask apertures; and
applying the mask code signal to the storage circuits so that agreement between the stored sum signal and the received mask code signal controls energization of the appropriate charge head.

14. The method of coordinating the energization of an array of charge heads in an electrostatic printer in selectively timed relation with the passage of character-denoting apertures in a mask electrode comprising the steps of:

receiving information signals having a different value for each different piece of information;
adding a column designation value, representative of the column position along a line in which the information signal is to be printed, to the information value to produce a sum signal denoting said information signal as referred to said column position;
storing the sum signal in the appropriate circuit of a memory array;
sensing the position of the mask to provide a mask code signal;
continually comparing the mask code signal with the sum signals previously stored in the circuits of the memory array; and
triggering a respective charge head at a given column location responsive to coincidence between the mask code signal and the sum signal stored in the memory circuit at said given column location.

15. The method of coordinating the energization of an array of charge heads in an electrostatic printer in selectively timed relation with the passage of character-denoting apertures in a mask electrode comprising the steps of:

doubling the value of each received character signal;

adding to the doubled character value a column designation value, representative of the column position along the line in which the character is to be printed, to produce a sum signal which represents said character signal referred to said column position;

storing the sum signal in the appropriate circuit of a memory array;

sensing the position of the mask to provide a mask code signal;

continually comparing the mask code signal with the sum signals stored previously in the memory array; and triggering the respective charge head at a given column location upon correlation between the mask code signal and the sum signal stored in the memory circuit at said given column location.

16. The method of selectively energizing respective ones of the charge heads in an electrostatic printing system as a continuous tape mask which defines a plurality of fonts of character-forming apertures therein is displaced past the array of charge heads, comprising the steps of:

receiving a line of characters in serial form, each different character having a different value;

doubling the value of each character value;

adding to the doubled character value a number denoting the desired column location of each received character to provide a sum signal indicative of a given received character referred to said desired column location;

subtracting, in the event the sum exceeds a predetermined maximum value, such maximum value from the sum to regulate printing of the character during passage of the succeeding mask font;

converting the resultant sum signal into a Grey type code;

storing the converted sum signals along a line of memory circuits at the appropriate column positions;

continually sensing the mask position and providing a mask code signal denoting the position of each character-forming aperture;

resetting the mask code signal as each succeeding font passes a reference sensing point;

converting the mask code signal into a Grey type code;

comparing the converted mask position signal against the converted sum signals stored in the various column positions of the memory; and selectively energizing the charge heads related to the various column positions in response to agreement between the stored sum value with the received mask code signal.

17. An electrostatic printing system in which an array of charge heads is disposed opposite a dielectric web, and a stencil electrode is positioned between said array of charge heads and the web so that energization of a charge head provides a cloud of ions for passage through and shaping by an aperture in the stencil electrode to deposit a character-shaped charged area on the web, said stencil electrode including an elongated ribbon of metallic material having its two end portions joined to provide an endless metallic tape mask defining a plurality of fonts of character-forming apertures in a first position on the mask, a series of timing slots for each font in a second position of the mask, each of said timing slots being aligned with one of said character-forming apertures, and an indexing slot for each font of apertures disposed in a third position of the mask to index the first character-forming aperture in each font of apertures, means for providing radiation for passage through the timing slots and the indexing slots, first sensing means positioned to receive incident radiation passing through one of said timing slots in the second position of the mask and to provide output signals responsive to such radiation, second sensing means positioned to receive incident radiation passing through an indexing slot in the third position of the mask and to provide an output signal responsive to such radiation, and a counter, connected to receive said output signals from the first and second sensing means and to provide a mask code signal, signifying the positions of the character-forming apertures, for regulating energization of the charge heads.

References Cited by the Examiner

UNITED STATES PATENTS

| | | | |
|---|---|---|---|
| 2,714,841 | 8/1955 | Demer et al. | |
| 2,714,843 | 8/1955 | Hoover | 95—4.5 |
| 2,720,586 | 10/1955 | Mark | 95—4.5 X |
| 2,726,940 | 12/1955 | Buhler. | |
| 2,944,147 | 7/1960 | Bolton. | |
| 2,955,894 | 10/1960 | Epstein. | |
| 3,058,415 | 10/1962 | Hoffmann. | |
| 3,165,045 | 1/1965 | Troll | 95—4.5 |
| 3,176,307 | 3/1965 | Dunlavey. | |
| 3,182,591 | 5/1965 | Carlson. | |
| 3,184,749 | 5/1965 | Groth. | |
| 3,188,929 | 6/1965 | Higonnet et al. | 95—4.5 |

ROBERT E. PULFREY, *Primary Examiner.*

DAVID KLEIN, *Examiner.*

E. S. BURR, *Assistant Examiner.*